UNITED STATES PATENT OFFICE 2,695,294
Patented Nov. 23, 1954

2,695,294

N,N'-SUBSTITUTED DIAMINE COMPOUNDS AND METHOD OF MAKING THE SAME

Ansel P. Swain, Springfield Township, Montgomery County, Pa., assignor to McNeil Laboratories, Incorporated, Philadelphia, Pa., a corporation of Pennsylvania No Drawing. Application December 19, 1952, Serial No. 327,044

6 Claims. (Cl. 260—268)

The present invention relates to novel chemical compounds and to the method of preparing the same; and, more particularly, it relates to N,N'-bis(benzodioxanylmethyl) ethylenediamine compounds possessing valuable sympatholytic properties.

There are mentioned in the literature and available on the market certain chemical compounds which possess sympatholytic properties, that is, they have the ability to prevent the actions of epinephrine and similar neurohormones in the human body and are able to diminish or prevent the activity of the sympathetic nervous system. These agents possess certain limitations, however, which severely restrict their field of use. Benzodioxanylmethyl piperidine, benzodioxanylmethyl diethylamine, and benzodioxanylmethyl piperazine, for example, can only be administered by injection and have only transient effects against circulating epinephrine. Such compounds are not effective in blocking the sympathetic nervous system and are even toxic at levels that are only partially effective; they are not usefully active on oral administration. Other compounds, while possessing more definite sympatholytic properties, are limited to administration by injection, since they have an irritating or corrosive effect on the stomach or the intestinal wall if taken orally.

An important advantage of the novel compounds of the present invention is that they do not produce the toxic effects that have been observed following either parenteral or oral administration of other sympatholytic agents; that is, they do not produce nausea, vomiting, tissue irritation, coronary constriction, and the like effects on the heart, blood vessels, and viscera.

The principal object of the present invention is to provide new chemical compounds possessing advantageous pharmaceutical properties.

Another object of the invention is to provide chemical compounds possessing valuable sympatholytic properties, which can be administered orally as well as by injection.

A further object is to provide chemical compounds which are effective in blocking the sympathetic nervous system as well as injected epinephrine and which may be administered orally as well as by injection for these purposes.

Other objects including the provision of a method of making the novel compounds will be apparent from a consideration of this specification and the claims.

In copending applications of Ansel P. Swain, Serial Numbers 327,043 and 327,045, both filed December 19, 1952, are disclosed and claimed compounds related to those of the present invention as well as the method of preparing them, and reference may be made, if desired, to said copending applications as amplifying the present disclosure.

The novel compounds of the present invention are N,N'-bis(benzodioxanylmethyl) ethylenediamine compounds having the following fundamental structural formula:

where R and $R_1$ are selected from the group consisting of hydrogen, alkyl groups containing from 1 to 3 carbon atoms, benzodioxanylmethyl groups having the structure

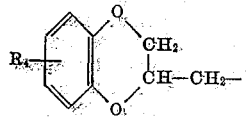

where $R_4$ is selected from the group consisting of hydrogen, methoxy, and alkyl groups containing from 1 to 4 carbon atoms, and a joined dimethylene linkage to complete the piperazine ring

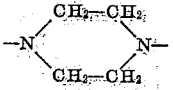

and where $R_2$ and $R_3$ are selected from the group consisting of hydrogen, methoxy, and alkyl groups containing from 1 to 4 carbon atoms.

The compounds of the present invention may be symmetrical or unsymmetrical, that is to say, in the formula given above, the R and $R_1$ groups may be identical or may be different, and the $R_2$ and $R_3$ groups may be identical or different. Appropriate methods of preparing the symmetrical and unsymmetrical compounds are set forth hereinafter. In addition, the exact position of the $R_2$, $R_3$, and $R_4$ groups, when alkyl or methoxy, on the benzene ring portion of the benzodioxanylmethyl groups is not critical and they may be on the 5, 6, 7, or 8 position, or the product may even be made up of a mixture of compounds differing as to the position of the $R_2$, $R_3$, and $R_4$ groups.

As stated, the R and $R_1$ groups in the above structural formula may be hydrogen or alkyl groups containing from 1 to 3 carbon atoms, that is methyl, ethyl, n-propyl, and iso-propyl. Either one or both of R and $R_1$ may also be a benzodioxanylmethyl group

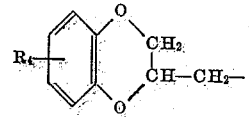

where $R_4$ is hydrogen, a methoxy group, or an alkyl group containing from 1 to 4 carbon atoms, that is methyl, ethyl, n-propyl, iso-propyl, allyl, n-butyl, sec-butyl, and tertiary butyl. When R and $R_1$ are both benzodioxanylmethyl groups, they may be different or the same. In addition, when either or each of R and $R_1$ is a benzodioxanylmethyl group, such group or groups may correspond to one or both of the benzodioxanylmethyl groups of the fundamental structural formula or may differ therefrom. The $R_2$ and $R_3$ substituents on the benzodioxanylmethyl groups of the fundamental structural formula are selected from the same groups as is $R_4$, namely hydrogen, methoxy and the alkyl groups containing from 1 to 4 carbon atoms.

The preferred compounds from the standpoint of highest sympatholytic activity are those in which, in the above formula, R and $R_1$ join through a dimethylene linkage (—$CH_2$—$CH_2$—) to complete the piperazine ring

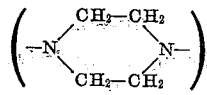

and thus the preferred compounds are the N,N'-bis(benzodioxanylmethyl) piperazine compounds, particularly the symmetrical N,N'-bis(benzodioxanylmethyl) piperazine compounds. In this connection, the N,N'-bis(1,4-benzodioxan-2-ylmethyl) piperazine compound, that is where $R_2$ and $R_3$ are both hydrogen, is a particularly advantageous sympatholytic agent.

The compounds of the present invention all possess valuable sympatholytic properties that are effective in blocking epinephrine and other neurohormones, whether the latter be injected or elaborated physiologically in the body. The compounds find particular utility, in addition to known uses for sympatholytic agents, in the treatment of hypertension. Moreover, the compounds can readily be administered orally without being toxic or producing other deleterious physiological effects, and are effective for the stated purposes when so administered. The compounds will range in activity from that of prior available sympatholytic agents to an activity many times greater. In this connection, the preferred group of compounds discussed above possess activity up to about ten times that of sympatholytic agents available commercially prior to the invention when administered parenterally, and, when administered orally, up to twenty to fifty times that obtained upon oral administration of prior agents.

In the compounds of the present invention, there are two basic nitrogens to which one or two equivalents of acid may be added to form a mono- or di-salt. Hence, the compounds of the invention may be prepared and/or employed either as the base or as a salt. Thus, for example, the structural formula for the dihydrochlorides of the compounds of the present invention may be written as follows:

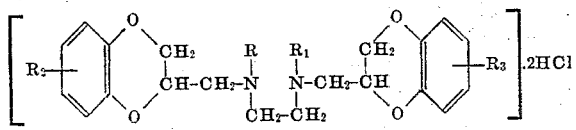

In view of the fact that the salts differ from the bases only in the addition of the acid to one or both of the nitrogen atoms referred to and are characterized by the same fundamental structural formula, the salts as well as the bases are included within the scope of this application and of the claims wherever reference is made to a compound comprising the stated structure.

The acid forming the salt may be any inorganic or organic acid desired, for example, hydrochloric, hydrobromic, hydroiodic, nitric, sulphuric, phosphoric, and the like; acetic, propionic, caproic, stearic, and other acids of this series, and the like; crotonic, oleic, oxalic, citric, tartaric, lactic, benzoic, naphthoic, picric, salicylic, dilituric, methane sulphonic, camphor sulphonic, and the like. If a salt is to be administered, any toxicity which may be imparted by the acid should be taken into consideration as well known in the art.

The compounds of the invention are readily prepared by condensing two moles of an appropriate benzodioxanylmethyl derivative having alkylating properties with one mole of an appropriate ethylenediamine providing the desired group:

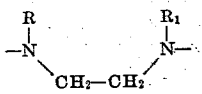

The diamine base itself may be used or a salt or hydrate thereof. As will appear hereinafter in the preparation of unsymmetrical compounds where $R_2$ and $R_3$ are different, in which case a two-step reaction is employed, the diamine compound employed may, during the first stage, have a readily removable blocking group attached to one nitrogen atom. All such compounds are included herein within the term "diamine compound." The fundamental structural formula for the diamine compound is represented by:

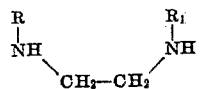

and for the benzodioxanylmethyl derivative by:

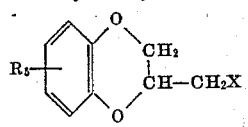

where R and $R_1$ are as hereinabove defined, where $R_5$ corresponds to the hereinabove-defined $R_2$, $R_3$ and $R_4$, and where X is selected from the group consisting of chlorine, bromine, iodine, sulfate, and phosphate, preferably chlorine or bromine.

Where, in the final product, $R_2$ and $R_3$ are to be identical, the two moles of benzodioxanylmethyl derivative can be made up of a single compound and these reacted simultaneously with the diamine compound. Where, however, $R_2$ and $R_3$ are to be different, the alkylation reaction can be carried out in two steps, by first reacting one mole of diamine compound with one mole of a benzodioxanylmethyl derivative containing the desired $R_2$, and then reacting the resulting product with one mole of another benzodioxanylmethyl derivative containing the desired $R_3$. In this connection, it may be desirable to block, during the first reaction step, one of the nitrogen atoms of the diamine compound so that the first benzodioxanylmethyl derivative selectively attaches to the other nitrogen atom. Following the first step, therefore, the blocking group may be removed as by hydrolysis and the resulting product subjected to the second reaction step with the second benzodioxanylmethyl derivative. Examples of such a blocking group are the carbalkoxy groups, such as the carbethoxy group ($C_2H_5OOC-$).

Following the principles outlined above, compounds in which R and/or $R_1$ is a benzodioxanylmethyl group or groups may be prepared. For example, an ethylenediamine compound may be reacted with three or four molar equivalents of benzodioxanylmethyl derivatives either at one time or in several steps depending on the nature of the particular compound desired, and such technique, when R and/or $R_1$ is to be a benzodioxanylmethyl group or groups, is the equivalent and included within the description set forth in the paragraph before the immediately preceding paragraph.

The reaction between the diamine compound and the benzodioxanylmethyl derivative may be carried out in alkaline aqueous- or alcoholic medium. When an aqueous medium is employed, the alkali used is advantageously sodium hydroxide, and when an alcoholic medium is employed, the alkali used is advantageously sodium carbonate. It is desirable to heat the reaction mixture until the reaction is complete, and in this connection refluxing is preferred. After the reaction is as complete as desired, the product may be conveniently separated from the reaction mixture by removal of part or all of the solvent used, or by filtration if the product is a solid. If the product is liquid, it may be removed by extraction with a suitable solvent such as ether. In isolating the product, it may be desirable to recover it as a salt and this may be accomplished by treating the reaction product or an extract thereof with a suitable acid of the type discussed hereinabove.

The following examples serve to illustrate further the present invention.

*Example I*

A mixture of 97 g. (0.5 gram mole) of piperazine hexahydrate, 185 g. (1 gram mole) of 2-chloromethyl-1,4-benzodioxan and 40 g. (1 gram mole) of sodium hydroxide in 125 ml. of water is refluxed for 96 hours and then cooled. The separated solid is collected, washed first with water and then with methanol, and dried. Crystallization from a mixture of chloroform and methanol gives white crystals melting from 162–167° C. The calculated analysis for $C_{22}H_{26}N_2O_4$ is C, 69.0; H, 6.9; N, 7.3. That found by analysis is C, 69.0; H, 6.9; N, 7.1.

The compound is N,N'-bis(1,4-benzodioxan-2-ylmethyl)-piperazine and has the structure:

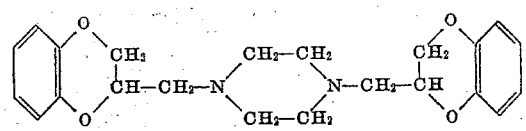

*Example II*

A mixture of 66.4 g. (0.309 gram mole) of a mixture of the 5-methoxy- and 8-methoxy- derivatives of 2-chloromethyl-1,4-benzodioxan, 29.9 g. (0.154 gram mole) of piperazine hexahydrate and 12.4 g. (0.309 gram mole) of sodium hydroxide in 35 ml. of water is refluxed for 48 hours and then cooled. The gummy solid which separates is collected, washed several times with water and dissolved in acetone. The addition of 6 normal hydrochloric acid causes the precipitation of the hydrochloride salts. Crystallization of the salts from a mixture of water and methanol gives white crystals melting at 263° C. with decomposition. The calculated N content for $C_{24}H_{32}Cl_2N_2O_6$ is 5.4; that found is 5.5. The product is a mixture of compounds having the structures:

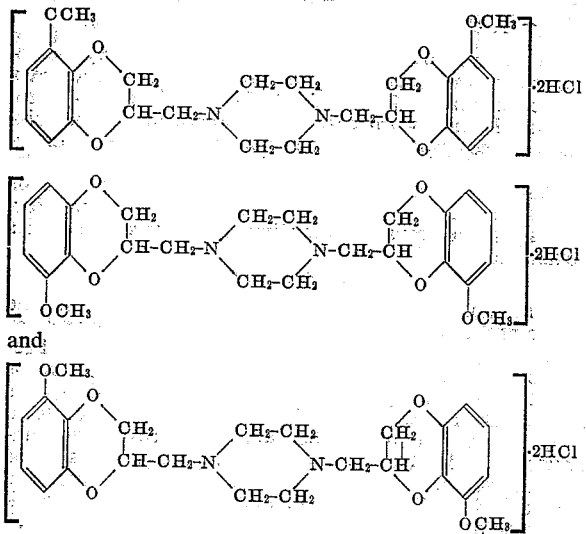

and:

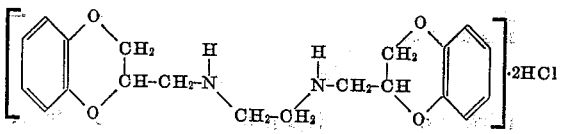

By using 5-methoxy-2-chloromethyl-1,4-benzodioxan, 6-methoxy-2-chloromethyl-1,4-benzodioxan, 7-methoxy-2-chloromethyl-1,4-benzodioxan, and 8-methoxy-2-chloromethyl-1,4-benzodioxan, respectively, in place of the mixture of the 5-methoxy- and 8-methoxy- derivatives of 2-chloromethyl-1,4-benzodioxan of this example, the corresponding N,N'-bis(5-methoxy-1,4-benzodioxan-2-ylmethyl)piperazine; N,N'-bis(6-methoxy-1,4-benzodioxan-2-ylmethyl)piperazine; N,N'-bis(7-methoxy-1,4-benzodioxan-2-ylmethyl)piperazine, and N,N'-bis(8-methoxy-1,4-benzodioxan-2-ylmethyl)piperazine, respectively, are prepared.

Following the same procedure, but using a 5-, 6-, 7-, or 8-methyl-2-chloromethyl-1,4-benzodioxan in place of the corresponding methoxy compounds, the corresponding N,N'-bis(5-methyl-1,4-benzodioxan-2-ylmethyl)piperazine; N,N' - bis(6-methyl-1,4-benzodioxan-2-ylmethyl)piperazine; N,N'-bis(7-methyl-1,4-benzodioxan-2-ylmethyl)piperazine, and N,N'-bis(8-methyl-1,4-benzodioxan-2-ylmethyl)piperazine are prepared. Likewise by using the ethyl-2-chloromethyl-1,4-benzodioxans, the corresponding N,N'-bis(ethyl-1,4-benzodioxan-2-ylmethyl)piperazines may be prepared. If mixtures of the methyl- or ethyl-2-chloromethyl-1,4-benzodioxans are used, the product will be a mixture like that described for the methoxy compounds above.

Example III

A mixture of 6.3 g. (0.1 gram mole) of 95% ethylenediamine, 37.0 g. (0.2 gram mole) of 2-chloromethyl-1,4-benzodioxan, and 8 g. (0.2 gram mole) of sodium hydroxide in 25 ml. of water is heated at 110–115° C. for 25 hours. After cooling, the reaction mixture is diluted with water and extracted with ether. Treatment of the ether layer with hydrogen chloride causes a solid to separate. Recrystallization of this solid from a mixture of methanol and ether gives the dihydrochloride salt of N,N'-bis(1,4-benzodioxan-2-ylmethyl) ethylenediamine. The calculated N content for $C_{20}H_{26}Cl_2N_2O_4$ is 6.5; that found is 6.3. The compound has the formula:

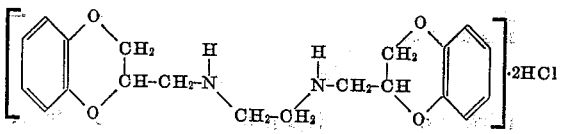

By following the procedures outlined in Example II in connection with this example, the corresponding N,N'-bis(methyl-1,4-benzodioxan-2-ylmethyl)-, N,N'-bis(ethyl-1,4-benzodioxan-2-ylmethyl)-, and N,N'-bis(methoxy-1,4-benzodioxan-2-ylmethyl) ethylenediamine compounds are prepared.

By reacting four molar equivalents of the 2-chloromethyl-1,4-benzodioxan, or the alkyl- or methoxy derivatives thereof, instead of two, the corresponding N,N,N',N'-tetrakis compounds may be prepared.

The N,N,N'-tris(benzodioxan-2-ylmethyl) compounds may be prepared by employing an initial blocking technique illustrated in Examples VII and VIII hereinafter set forth.

Example IV

A mixture of 10.5 g. (0.065 gram mole) of N,N'-dimethylethylenediamine dihydrochloride, 24.0 g. (0.13 gram mole) of 2-chloromethyl-1,4-benzodioxan and 10.4 g. (0.26 gram mole) of sodium hydroxide in 30 ml. of water is refluxed for 48 hours, cooled, diluted with water and extracted with ether. The ether layer is extracted several times with an equal volume of 6 normal hydrochloric acid. The acid extract is neutralized with potassium carbonate and extracted with ether. After drying, the ether extract is treated with anhydrous hydrogen chloride. The white solid which separates is collected and recrystallized from a mixture of methanol and ether yielding white crystals which melt at 227° C. with decomposition. The calculated N content for $C_{22}H_{30}Cl_2N_2O_4$ is 6.1; that found is 6.2. The compound has the formula:

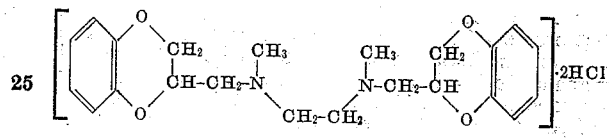

Following the procedure outlined in Example II in connection with this example, the corresponding N,N'-bis(methyl-1,4-benzodioxan-2-ylmethyl)-N,N'-dimethylethylenediamine, N,N'-bis(ethyl-1,4-benzodioxan-2-ylmethyl)-N,N'-dimethylethylenediamine and N,N'-bis(methoxy-1,4-benzodioxan-2-ylmethyl)-N,N'-dimethylethylenediamine compounds are prepared.

Example V

Following the procedure outlined in Example IV, but using N, N'-diethylethylenediaminedihydrochloride in place of the N,N'-dimethylethylenediaminedihydrochloride, the corresponding N,N'-bis(1,4-benzodioxan-2-ylmethyl)-N,N'-diethylethylenediamine compound is prepared. The white crystals melt at 212° C. with decomposition. The calculated N content for $C_{24}H_{34}Cl_2N_2O_4$ is 5.8; that found is 5.7. The compound has the formula:

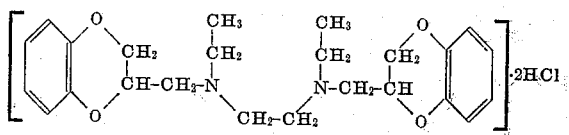

Following the procedure outlined in Example II in connection with this example, the corresponding N, N'-bis(methyl-1,4-benzodioxan-2-ylmethyl)-N, N'-diethylethylenediamine, N,N' - bis(ethyl - 1,4-benzodioxan-2-ylmethyl)-N, N'-diethylethylenediamine and N, N'-bis(methoxy-1,4 - benzodioxan - 2-ylmethyl)-N, N'-diethylethylenediamine compounds are prepared. By substituting N, N'-dipropyl-ethylenediamine dihydrochloride for the N, N'-diethylethylenediamine dihydrochloride, the corresponding N, N'-dipropylethylenediamine compounds are prepared.

Example VI

Following the procedure outlined in Example IV, but using N-ethylethylenediamine dihydrochloride in place of N, N'-dimethylethylenediamine dihydrochloride, the corresponding N, N'-bis(1,4-benzodioxan-2-ylmethyl)-N-ethylethylenediamine salt having the formula:

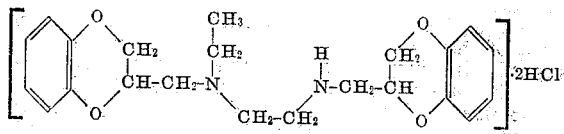

is prepared, as may be the corresponding N, N'-bis(methyl - 1,4-benzodioxan-2-ylmethyl)-N-ethylethylenediamine, N,N' - bis(ethyl - 1,4 - benzodioxan-2-ylmethyl)-N-ethylethylenediamine, and N,N'-bis(methoxy-1,4-benzodioxan-2 - ylmethyl) - N-ethylethylenediamine compounds. By substituting N-methylethylenediamine dihydrochloride, N-methyl-N'-ethylethylenediamine dihydrochloride, N-propylethylenediamine dihydrochloride, N-propyl-N'-methylethylenediamine dihydrochloride, or N-propyl-N'-ethylethylenediamine dihydrochloride, respectively, for the N,N'-dimethylethylenediamine dihydrochloride of Example IV, the corresponding N,N'-bis(benzodioxan-2-ylmethyl) - N-methyl-ethylenediamine, N,N'-bis(benzodioxan - 2 - ylmethyl)-N-methyl-N'-ethylethylenediamine, N,N' - bis(benzodioxan - 2-ylmethyl)-N-propylethylenediamine, N, N'-bis(benzodioxan-2-ylmethyl)-N-propyl-N'-methylethylenediamine or N,N' - bis(benzodioxan-2-ylmethyl) - N-propyl-N'-ethylethylenediamine compounds, respectively, are prepared.

Example VII

One mole of piperazine hexahydrate and one mole of 2-chloromethyl-1,4-benzodioxan are refluxed in the presence of one mole of anhydrous sodium carbonate in methanol for 64 hours. After filtration and removal of the solvent, the residue is washed with water and extracted with diethyl ether. Addition of anhydrous hydrogen chloride to the dried ether solution causes a solid to separate. Recrystallization of this solid from a mixture of acetone and ether gives the monohydrochloride of N-(1,4-benzodioxan-2-ylmethyl)piperazine. The calculated analysis for $C_{13}H_{19}ClN_2O_2$ is Cl, 13.1; N, 10.4. That found by analysis is Cl, 13.4; N, 10.3.

Alternatively, this compound is prepared from its N'-carbethoxy derivative by hydrolysis in potassium hydroxide-methanol solution, working the hydrolysate up in a manner similar to that just described. The N'-carbethoxy derivative is obtained by heating together two moles of N-carbethoxypiperazine and one mole of 2-chloromethyl-1,4-benzodioxan at 100° C. for 32 hours. Dilution of the mixture with ether precipitates carbethoxypiperazine hydrochloride, which is removed by filtration. Addition of anhydrous hydrogen chloride to the filtrate precipitates a solid. Recrystallization of this solid from a mixture of methanol and ether gives the hydrochloride of N-(1,4 - benzodioxan- 2 -ylmethyl)-N'-carbethoxypiperazine melting at 235° C. The calculated analysis for $C_{16}H_{23}ClN_2O_4$ is Cl, 10.34; N, 8.18. That found by anaylsis is Cl, 10.50; N, 8.16. The compound has the structure:

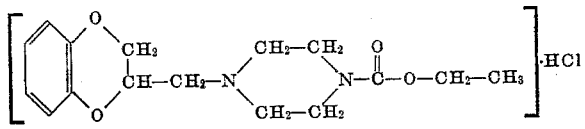

Hydrolysis of this compound gives N-(1,4-benzodioxan-2-ylmethyl)piperazine monohydrochloride melting at 197° C. and showing no depression in melting point when mixed with the compound prepared by reaction of 2-chloromethyl-1,4-benzodioxan and piperazine hexahydrate.

This N-(1,4-benzodioxan-2-ylmethyl)piperazine monohydrochloride may be condensed with 2-chloromethyl-1,4-benzodioxan to give the compound of Example I, or with 5-methyl-2-chloromethyl-1,4-benzodioxan to give N-(5-methyl - 1,4-benzodioxan- 2 -ylmethyl)-N'-(1,4-benzodioxan-2-ylmethyl)piperazine, or with 5-methoxy-2- chloromethyl-1,4-benzodioxan to give N-(5-methoxy-1,4-benzodioxan- 2 -ylmethyl)-N'-(1,4-benzodioxan- 2 -ylmethyl)-piperazine. Similarly, the use of 6-, 7-, or 8-alkyl- or methoxy compounds gives the corresponding products, that is where $R_2$ in the fundamental structural formula is hydrogen and $R_3$ is an alkyl group containing 1 to 4 carbon atoms or a methoxy group.

By using 5-methyl-2-chloromethyl-1,4-benzodioxan instead of the 2-chloromethyl-1,4-benzodioxan in the first step of this example, the corresponding N-(5-methyl-1,4-benzodioxan - 2 - ylmethyl)piperazine hydrochloride may be obtained. Condensing this with 5-methoxy-2-chloromethyl-1,4-benzodioxan gives N-(5-methyl-1,4-benzodioxan- 2 -ylmethyl)-N'-(5-methoxy-1,4-benzodioxan- 2 - ylmethyl)piperazine. In a similar manner, the 6-, 7-, 8- alkyl- or methoxy compounds can be obtained. That is where, in the fundamental structural formula, $R_2$ is an alkyl group containing from 1 to 4 carbon atoms or a methoxy group and $R_3$ is a methyl group.

If N-(5-methoxy-1,4-benzodioxan-2-ylmethyl)piperazine hydrochloride is condensed with 8-methoxy-2-chloromethyl-1,4-benzodioxan, the product is N-(5-methoxy-1,4-benzodioxan- 2 -ylmethyl)-N'-(8-methoxy-1,4-benzodioxan-2-ylmethyl)piperazine, a component of the mixture whose preparation is described in Example II, represented by the third formula given under that example. Similarly, the other unsymmetrical piperazine compounds included within the generic fundamental structural formula may be prepared according to the procedure of this example.

Example VIII

One mole of ethylethylenediamine is heated with one mole of 2-chloromethyl-1,4-benzodioxan and one mole of sodium hydroxide in water for 16 hours. The cooled reaction mixture is extracted with ether and the extract is treated with dilute hydrochloric acid. The acid layer is made alkaline with potassium carbonate and extracted with ether. The dried ether solution is treated with anhydrous hydrogen chloride and the precipitated solid is crystallized from a mixture of acetone, methanol, and ether and finally from methanol alone to give the dihydrochloride of N-(1,4-benzodioxan-2-ylmethyl)-N'-ethylethylenediamine. The calculated N content for $C_{13}H_{22}Cl_2N_2O_2$ is 9.1; that found is 8.8. Alternatively, the reaction may be carried out in the presence of anhydrous sodium carbonate in methanol by the procedure of Example VII; or by hydrolysis of the corresponding N'-carbethoxy derivative.

Condensation of N-(1,4-benzodioxan-2-ylmethyl)-N'-ethylethylenediamine dihydrochloride with one mole of 2-chloromethyl-1,4-benzodioxan gives N, N'-bis(1,4-benzodioxan-2-ylmethyl)-N-ethylethylenediamine, the compound whose formula appears in connection with Example VI. Using 5-methyl-2-chloromethyl-1,4-benzodioxan instead of 2-chloromethyl-1,4-benzodioxan gives N-(5-methyl-1,4 - benzodioxan- 2 -ylmethyl)-N-ethyl-N'-(1,4-benzodioxan-2-ylmethyl)ethylenediamine. Similarly, 5-methoxy-2-chloromethyl-1,4-benzodioxan gives N-(5-methoxy-1,4-benzodioxan- 2 -ylmethyl)-N-ethyl - N'-(1,4-benzodioxan-2-ylmethyl)ethylenediamine. Use of the 6-, 7-, or 8-alkyl- or methoxy derivatives gives the corresponding products.

By using 5-methyl-2-chloromethyl-1,4-benzodioxan instead of 2-chloromethyl-1,4-benzodioxan in the first step of this example, the corresponding N-(5-methyl-1,4-benzodioxan-2-ylmethyl)-N'-ethylethylenediamine may be obtained. Condensing this with 5-methoxy-2-chloromethyl-1,4-benzodioxan gives N-(5-methoxy-1,4-benzodioxan - 2 - ylmethyl)-N-ethyl-N'-(5-methyl-1,4-benzodioxan-2-ylmethyl)ethylenediamine. In a similar manner, use of 5-methoxy-2-chloromethyl-1,4-benzodioxan in the first step gives N-(5-methoxy-1,4-benzodioxan-2-ylmethyl)-N'-ethylethylenediamine which, when condensed with 5-methoxy-2-chloromethyl-1,4-benzodioxan gives N-(5-methyl-1,4-benzodioxan-2-ylmethyl)-N-ethyl- N' -(5-methoxy-1,4 - benzodioxan- 2 -ylmethyl)ethylenediamine. Use of the 6-, 7-, or 8-alkyl- and methoxy derivatives gives the corresponding products.

By substituting ethylenediamine; N, N'-dimethylethylenediamine; N, N'-diethylethylenediamine; N, N'-dipropylethylenediamine; N-methylethylenediamine; N-ethyl-N'-methylethylenediamine; N-propyl-N'-methylethylenediamine; or their carbethoxy derivatives for the N-ethylethylenediamine in the first reaction, the corresponding products may be obtained.

Example IX

A mixture of 22.6 g. (0.1 gram mole) of a mixture of the 5-allyl- and 8-allyl-derivatives of 2-chloromethyl-1,4-benzodioxan, 9.7 g. (0.05 gram mole) of piperazine hexahydrate and 4.0 g. (0.1 gram mole) of sodium hydroxide in 15 ml. of water is heated at 110° C. for 48 hours. The reaction mixture is diluted with water and extracted with ether. Addition of 6 normal hydrochloric acid to the ether extract causes a solid to separate. Crystallization of the solid from a mixture of methanol and ether gives white crystals melting at 246 to 249° C. The calculated N content for $C_{28}H_{36}Cl_2N_2O_4$ is 5.2; that found is 5.3. The product is a mixture of compounds having the structures

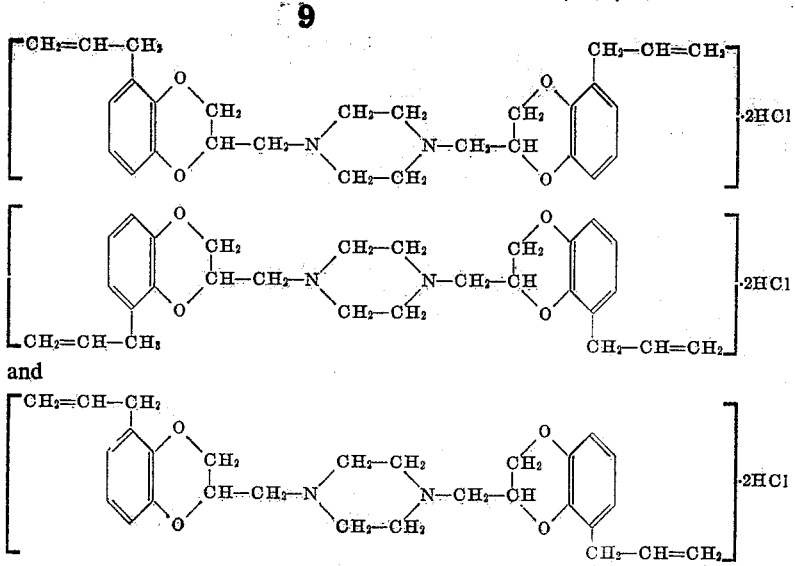

Example X

Following the procedure outlined in Example IX, but using a mixture of the 6-allyl- and 7-allyl- derivatives of 2-chloromethylbenzodioxan, a mixture of the 6,6'-diallyl-, 7,7'-diallyl-, and 6,7'-diallyl derivatives is prepared. The white crystals melt at 262° C. with decomposition. The calculated N content for $C_{28}H_{36}Cl_2N_2O_4$ is 5.2; that found is 5.2. The product is a mixture of compounds having the structures of piperazine hexahydrate and 2.7 g. (0.0685 gram mole) of sodium hydroxide in 3 ml. of water is heated at 110° C. for 52 hours. The reaction product is diluted with water and extracted with ether. The residue remaining after evaporation of the ether from the ether extract is crystallized from a mixture of acetone and water to give an oil and a white solid. Crystallization of the solid from a mixture of 1,4-dioxan and water gives white crystals melting at 160–161° C. The calculated N content for $C_{30}H_{42}N_2O_4$

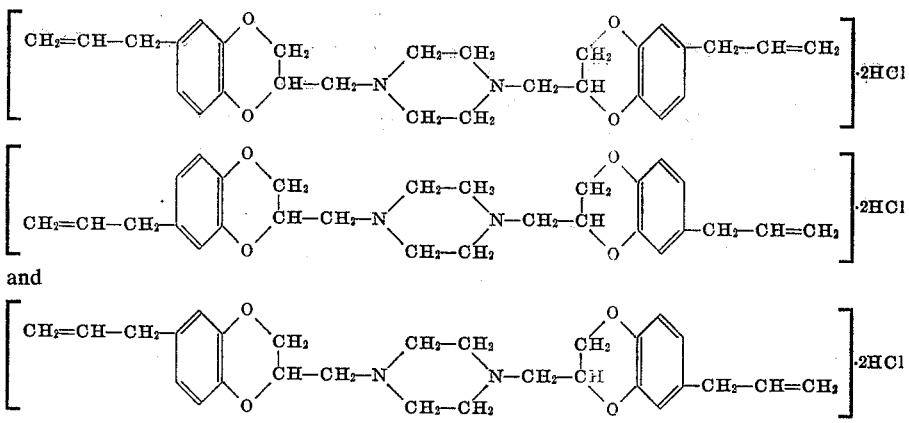

Example XI

A mixture of 16.5 g. (0.0685 gram mole) of a mixture of the 6-tert. butyl- and 7-tert. butyl- derivatives of 2-chloromethyl-1,4-benzodioxan, 6.7 g. (0.0342 gram mole)

is 5.6; that found is 5.4. The product is a mixture of the 6,6'-, 7,7'-, and 6,7'-di-tertiary butyl derivatives of N,N'-bis(1,4 - benzodioxan - 2 - ylmethyl)piperazine having the formulae:

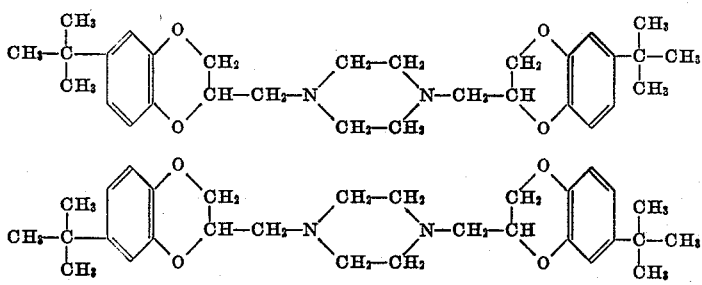

and

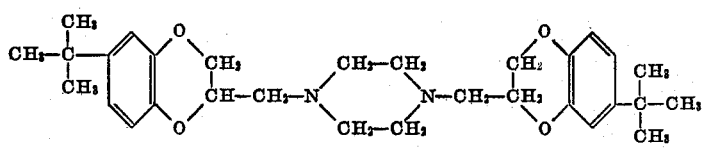

Considerable modification is possible in the selection of the various constituents and combinations of constituents and in the particular salt formed, where desired, as well as in the particular techniques employed in preparing the compounds without departing from the scope of the invention.

I claim:

1. N,N' - bis(benzodioxanylmethyl) ethylenediamine compounds having the fundamental structural formula:

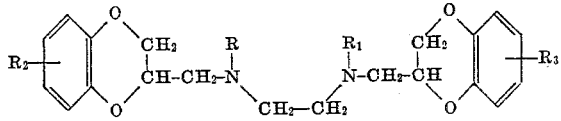

where R and $R_1$ are selected from the group consisting of hydrogen, alkyl groups containing from 1 to 3 carbon atoms, benzodioxanylmethyl groups.

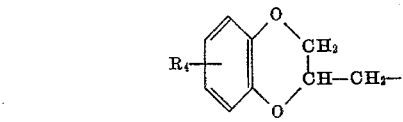

and a joined dimethylene linkage —$CH_2$—$CH_2$— to complete the piperazine ring

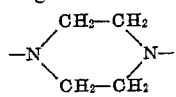

and where $R_2$, $R_3$ and $R_4$ are selected from the group consisting of hydrogen, methoxy and alkyl groups containing from 1 to 4 carbon atoms.

2. N,N' - bis(1,4 - benzodioxan - 2 - ylmethyl) piperazine compounds having the fundamental structural formula:

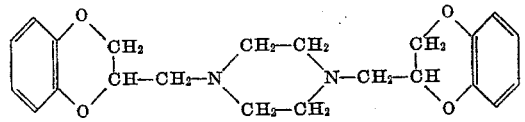

3. N,N' - bis(methoxy - 1,4 - benzodioxan - 2 - ylmethyl) piperazine compounds having the fundamental structural formula:

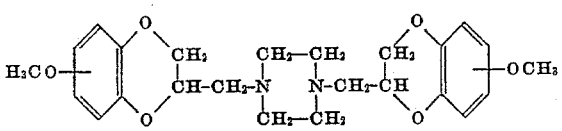

4. N,N' - bis(1,4 - benzodioxan - 2 - ylmethyl) ethylenediamine compounds having the fundamental structural formula:

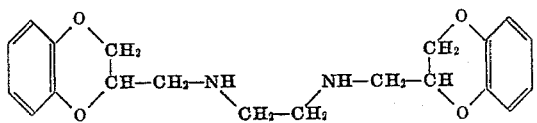

5. N,N' - bis(1,4 - benzodioxan - 2 - ylmethyl) N,N'-dimethylethylenediamine compounds having the fundamental structural formula:

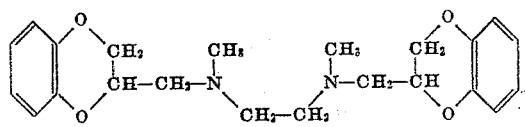

6. N,N' - bis(methyl - 1,4 - benzodioxan - 2 - ylmethyl) ethylenediamine compounds having the fundamental structural formula:

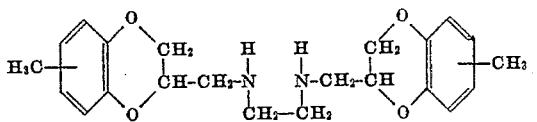

No references cited.